May 17, 1960  D. A. WATT  2,936,711

ELECTROMAGNETIC PUMPS

Filed Aug. 8, 1956

United States Patent Office 2,936,711
Patented May 17, 1960

2,936,711
ELECTROMAGNETIC PUMPS

Dudley A. Watt, Oxford, England, assignor to the United Kingdom Atomic Energy Authority, London, England Application August 8, 1956, Serial No. 602,817
Claims priority, application Great Britain August 12, 1955

2 Claims. (Cl. 103—1)

This invention relates to electromagnetic pumps of the linear conduction type described in my patent specification No. 2,686,474.

In said specification a means in the form of a return conductor which passes through the gap in the iron circuit to compensate for "armature reaction" is described.

Complete compensation can be obtained by such means when the return conductor is another duct containing the liquid being pumped since the current distribution, including the end effects, produced by armature reaction is substantially identical in the go and return conductors.

When employing a static return conductor, exact compensation for the end effects is not automatically obtained since the current distribution in the return conductor is different from that in the liquid. One method of reducing the effect is to minimise the end effects by placing baffles in the path of the end currents to confine most of the current within the pumping region. However, in a linear conduction pump employing baffles and shaped poles it is known to provide a static return conductor which is wider than the pumping region so as to provide some compensation for the remaining end effects.

The present invention seeks to provide a static return conductor for a linear conduction pump of the type referred to which affords substantially complete compensation for the end effects whether controlled by baffles or not and to this end, according to the invention. The return conductor is profiled to correspond to the significant limit of the current flow in the fluid duct when viewed in the direction of the magnetic field and its thickness is varied such that the current distribution is similar to that in the liquid being pumped and in the containing duct.

The invention may be used with or without any of the known means of controlling the end effects in the liquid duct, the return conductor of the invention being designed to suit the actual current distribution which prevails in the liquid and the duct.

The nature of the invention will be more readily understood if reference is made to the accompanying drawing illustrating by way of example one form of the invention as applied to a liquid metal linear conduction pump. In the drawing.

Figure 1:
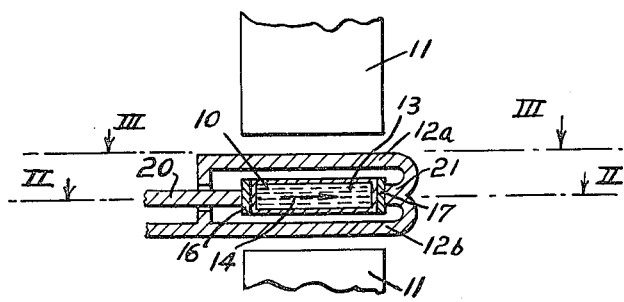
Fig. 1 is a diagrammatic cross section through the liquid metal duct at the pole faces.

In Fig. 1 a flat rectangular section liquid metal duct 10 is shown arranged between magnetic poles 11 in the known manner of a linear conduction pump. Current is passed through the liquid metal 13 in the duct in the direction of the arrow 14 via electrodes 16 and 17 connected to conductors 20 and 21 and is returned through the gap between the poles 11 by two conductors 12a and 12b respectively above and below the liquid metal duct, as disclosed in our aforesaid patent specification.

The spacing between the duct, return conductors and the poles has been exaggerated for the sake of clarity.

Figure 2:
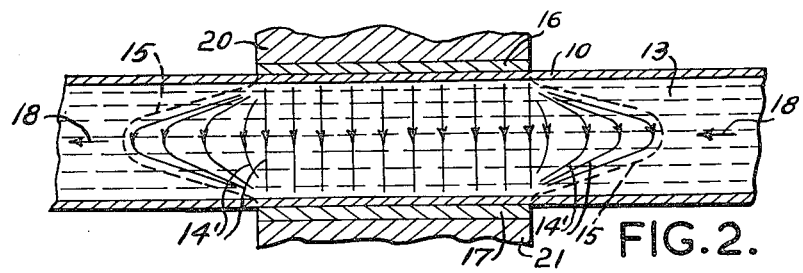
Fig. 2 is a plan view of the duct of Fig. 1 sectioned on line II—II, and rotated clockwise 90 degrees showing the probable limits of significant current flow in the liquid metal under the designed operating conditions

The arrows 14′ in Fig. 2 show the pattern of current flow in such a pump, the broken lines 15 indicating the limits of significant current flow in the liquid metal 13 and in the broad faces of the duct 10. The direction of liquid metal flow is shown by the arrows 18.

Figure 3:
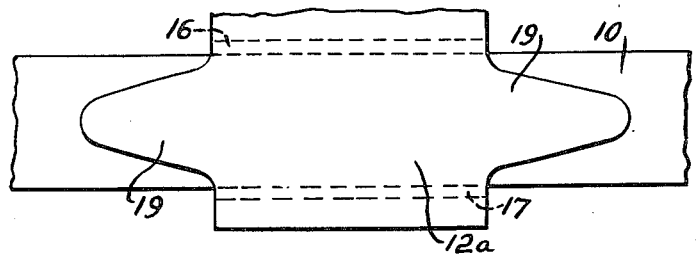
Fig. 3 is a plan view on the line III—III, and rotated clockwise 90 degrees of Fig. 1 showing the shape of the return conductors for the current limits shown in Fig. 2.

Fig. 3 shows the shape in plan of the return conductor 12a of the invention, which is provided with lateral extensions or lobes 19 extending beyond the electrodes 16 and 17 in both directions along the duct and designed to match the limits 15 of current flow shown in Fig. 2. It will be seen that the profile of the extensions 19 correspond to those limits. The conductor 12b, which is hidden below the duct 10 in Fig. 3, is similarly shaped.

The combined thickness of the extensions 19 of the two return conductors 12a and 12b is made such that the current density at any point in the extension is substantially the same as the current density at the corresponding point in the liquid metal and duct under the designed operating conditions.

The required thickness at any point may be obtained experimentally until, with the main field on, there is no change in gap field when the pump current is applied and the liquid is allowed to move at the designed flow rate.

It will be appreciated that the invention may be applied to any other form of static return conductor arrangement including a single return conductor. In the case of the double return conductor, one only of the conductors may be profiled in accordance with the invention. Also, the current density in a region within the plan outline of the return conductor may be of such a low value that a hole in the conductor, i.e. zero thickness, would provide a closer approximation to a thickness corresponding to that density than the minimum thickness called for by mechanical considerations.

I claim:

1. A D.C. or single phase A.C. linear conduction electromagnetic interaction pump comprising, an iron yoke presenting two pole faces, means for setting up a flux in the yoke to cross the gap between the pole faces, a duct in the gap arranged to be traversed by the flux in one direction and having electrodes for the passage of current across the duct and through a liquid contained therein angularly with respect to the flux, and an electrical conductor connected to one of said electrodes and shaped to pass through the gap between the pole faces in a direction opposite to that taken by the current across the duct, said conductor being provided with lateral extensions extending beyond said electrodes in both directions along the duct, said extensions being profiled to correspond to the significant limit of the current flow in the liquid and in the duct when said conductor is viewed in the direction of the flux, and having their thickness varied such that the current distribution in the extensions is similar to that in the liquid and the duct.

2. An electromagnetic pump of the linear conduction type comprising an iron yoke having a gap and a field across the gap, a fluid duct in said gap, and at least one return conductor which passes through the gap in the yoke to compensate for armature reaction, the return conductor being provided with lateral extensions extending in both directions along the duct, said extensions being profiled to correspond to the significant limit of the current flow in the fluid duct when said conductor is viewed in the direction of said field, and the thickness of said extensions being varied such that the current distribution therein is similar to that in the liquid being pumped in the duct.

References Cited in the file of this patent

UNITED STATES PATENTS 2,686,474    Pulley _____ Aug. 17, 1954